Figure 1:
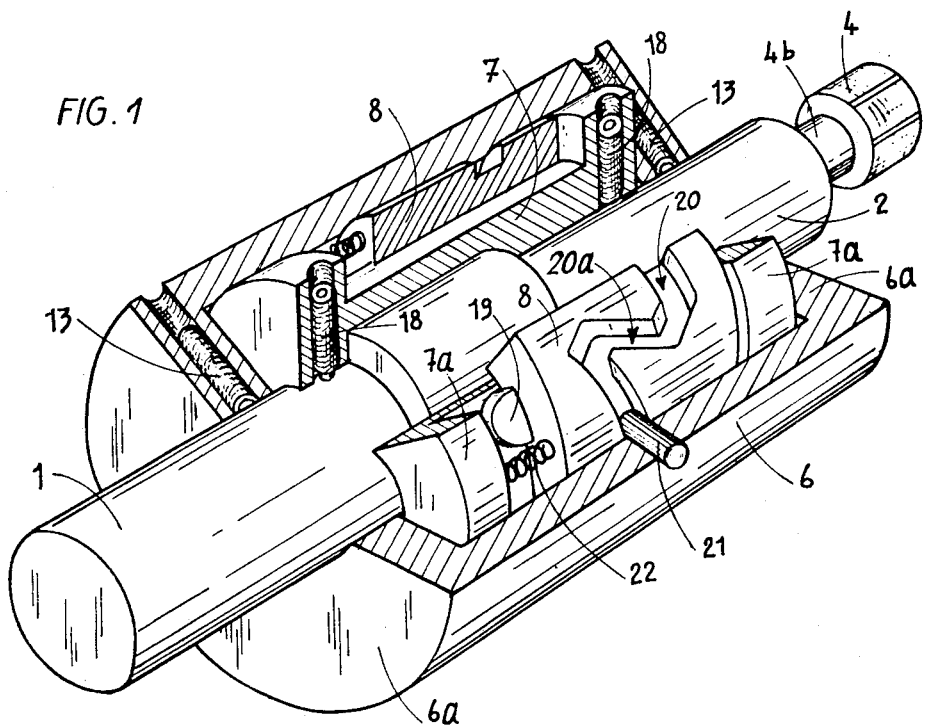

United States Patent
Matthey

[11] 3,727,469
[45] Apr. 17, 1973

[54] TAP-CARRIER

[75] Inventor: Maurice L. Matthey, Versoix, Switzerland

[73] Assignee: Manutar S.A., Fribourg, Switzerland

[22] Filed: June 2, 1971

[21] Appl. No.: 149,232

[30] Foreign Application Priority Data

June 4, 1970 Switzerland....................8437/70

[52] U.S. Cl.......................74/89, 408/239, 10/136 E
[51] Int. Cl..............................................F16h 27/02
[58] Field of Search..........................74/89; 10/136; 408/238, 239

[56] References Cited

UNITED STATES PATENTS

| 1,708,766 | 4/1929 | Lochner | 408/239 |
|---|---|---|---|
| 2,399,966 | 5/1946 | Welch | 408/238 |
| 2,845,639 | 8/1958 | Jorgenssen et al. | 10/136 E |
| 3,256,541 | 6/1966 | Russo | 408/239 |
| 2,970,844 | 2/1961 | Better | 408/239 |
| 3,023,015 | 2/1962 | Pankow | 408/238 |
| 3,174,168 | 3/1965 | Jones | 408/238 |
| 3,412,594 | 11/1968 | Lund | 408/239 |
| 2,944,431 | 7/1960 | Dexter | 74/89 |
| 3,417,218 | 12/1968 | Norwood | 74/89 |
| 3,520,202 | 7/1970 | Hudson et al. | 74/89 |

Primary Examiner—Charles J. Myhre
Assistant Examiner—Wesley S. Ratliff, Jr.
Attorney—Kenwood Ross

[57] ABSTRACT

A tap carrier designed to impart to a tap a certain amount of angular play, of limited amplitude resulting in a dead motion, starting at the moment when rotation is reversed and having a determined angular value, all compensating for any lack of synchronization between the rotational and forward displacements which temporarily occur after reversal.

2 Claims, 2 Drawing Figures

PATENTED APR 17 1973  3,727,469

INVENTOR
MAURICE L. MATTHEY
BY Kenwood Ross &
Chester E. Flavin
ATTORNEYS

TAP-CARRIER The present invention concerns a tap carrier.

In the case of usual tap carriers, the tap is set up with a certain axial play so that, if its axial or rotational displacements with respect to the work piece are not perfectly synchronized, or if they do not correspond exactly to the thread pitch of the tap, the latter can, while digging into the tapping, move axially with respect to the tap carrier against the action of a return spring. Thus, the tap is guided and maintained by the tap carrier which follows it without pushing or pulling it, its rate of progression being determined by its own thread.

When the direction of rotation is reversed, at the end of a cut, a temporary mismatch may occur between the rotational and longitudinal displacements, caused for instance by some play in the drive mechanisms, so that during tap removal, the tap is slow or fast with respect to the tap carrier and may arrive at the end of its stroke, along the tap carrier, while not yet completely out of the tapped hole. This may lead to the result that the leading threads of the tapping are damaged by the tap, at the end of the tap removal operation.

The object of the present invention is to cope with this difficulty by imparting to the tap a certain amount of angular play, of limited amplitude, resulting in a dead motion, starting at the moment when the rotation is reversed and having a determined angular value, which compensates for a possible lack of synchronization between the rotational and forward displacements which temporarily occur after reversal.

The tap carrier comprises two elements one axially aligned with the other, one being attached to a machine tool and the other accommodating the tap with a certain amount of axial play, the two elements being further made angularly solid one with the direction of other except for a certain amount of play that gives to the tap a limited angular freedom when the rotation way is reversed.

Figure 2:
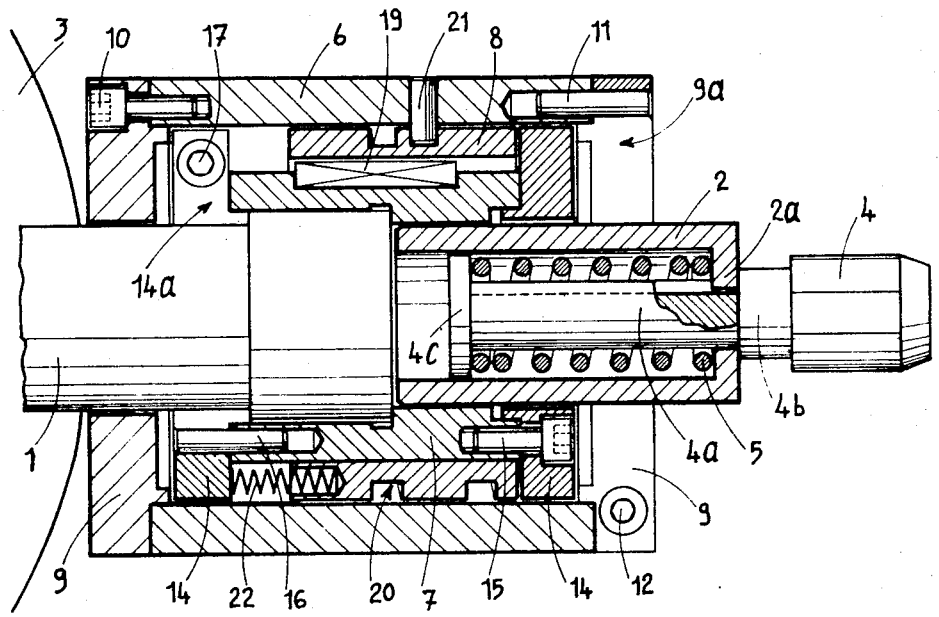

In the drawings:

FIG. 1 is a schematic view, in perspective, of a tap carrier, with parts broken away for clarity, and FIG. 2 is an axial longitudinal section, some details being represented in a more elaborate fashion than in the perspective view of FIG. 1.

The tap carrier represented comprises two coaxial shafts, one abutting the other, one intended to be attached to a machine tool, e.g. in one of the work-sites of a revolving turret such as the one represented in 3 on FIG. 2. Shaft 2 is axially bored and accomodates the shank 4a of a tap 4. The latter can slide axially into shaft 2 although it is angularly locked relative thereto. A helical spring 5 is jammed over shank 4a and retains the tap in the position represented in the drawing, wherein part 4b of shank 4a, having a greater diameter than part 4a, rests against the end 2a of shaft 2; helical spring 5 rests at one end against the end 2a of shaft 2 and on the other end against head 4c of the tap shank 4a.

The tap carrier comprises three bushings 6, 7 and 8 concentrically related to each other. The external bushing 6 has two terminal cheeks 9 fastened by screws 10 and positioned by pins 11, each being slotted at 9a and having a tangent screw 12 to tighten it onto the shaft extendable therethrough. It should be noticed that, for the sake of clarity, the two cheeks 9 have been represented in the drawing with a 90° angular shift therebetween so that the slotted part and the tangent screw 12 are visible on the left of FIG. 2, whereas one of the fastening screws 10 is visible on the left side cheek. In addition, this arrangement has been replaced in FIG. 1, also for the sake of clarity, by two radial screws 13 inserted into the two terminal cheeks 6a of the bushing 6, both of these parts being represented as cast in one piece.

The inside bushing 7 has also two side cheeks 14, fastened by screws 15 and positioned by pins 16; they are slotted in 14a and subjected each to the action of a tangent screw 17 to tighten them, as in the case of cheek 9, on shafts 1 and 2 respectively. These two cheeks 14 are represented with 90° angular shift between them so that the slotted part 14a and the tangent screw 17 for tightening them are visible on the left side cheek represented on FIG. 2. In addition, this arrangement has been replaced in FIG. 1, for improving the clarity of the drawing, by two radial screws 18 inserted into the two terminal cheeks 7a of the bushing 7, both of these parts being represented as cast in one piece.

The intermediate sleeving 8 can slide over the inside bushing 7 but is angularly locked with it by means of a key 19. On its external face, it has a helical groove 20, acting as a cam, extending around a 360° arc, the two ends of which are connected together by an S shaped portion 20a (FIG. 1). The external bushing carries an inward lug 21 meshing with groove 20.

Finally, helical springs 22 retain the intermediate sleeving 8 in the position represented on the drawing, wherein the lug 21 is positioned at one end of the helical groove 20.

The tap carrier operates as follows:

By means of the tightening means 9a and 12, one of the cheeks is made solid with one of the shafts 1 and 2. For instance, the right handed cheek 9 of FIG. 2 is made solid with shaft 2. In this case, the left handed cheek 14 is made solid, by means of slot 14a and screw 17, with shaft 1. Hence, when a reversal of the direction of rotation of the spindle of the machine carrying the work piece occurs, the tap does not immediately start its longitudinal untapping stroke but rotates with the piece over an angular distance of 360° which corresponds to the progression of lug 21 along groove 20 of the sleeving 8, from one end to the other end of the latter.

As a consequence, whenever a temporary lack of synchronization exists between the rotation of the machine spindle and the longitudinal displacement of the revolving turret carriage, owing for instance to some possible play in connection with the respective driving mechanisms, the shank 4a of the tap 4 will not reach the end of its stroke along shaft 2 before the removal of the tap is finished, which suppresses the risk of stripping the thread of the piece with the tap at the end of the untapping operation.

It should be noticed that the resetting of the sleeving or cam 8, at the end of the untapping operation, takes place automatically because of the S shape of the groove 20. Thus, the present arrangement does not require any special resetting, manually, mechanically or electrically, said resetting occurring automatically because of the shape of the groove 20.

Helical compression springs 22 are placed between cheek 14 and cam 8. These springs work axially on cam 8 for maintaining it in proper position during the indexing motion of the turret whereon the tap carrier is set up, and avoid the possibility that, because of inertia reasons, it might modify its position which would upset the operation of the tap carrier at the beginning of the tapping.

To shift from a clockwise thread to an anticlockwise thread, it will be enough to reverse the tightening so that the bushing made solid with one of the two shafts becomes solid with the other shaft, making the internal and external bushings solid with shafts 1 and 2.

It should be noticed that shifting from a clockwise tapping to an anti-clockwise tapping could also be achieved if the internal and external bushings were made definitely integral with one of the shafts 1 and 2, by means of a correct choice in the starting position of the intermediate sleeving 8, carried out when the latter is built up, the direction of the groove 22 producing no interference with the operation of the tap carrier.

What I claim is:

1. In a tap carrier associated with a machine tool and carrying a tap and allowing an angular play between tap and tap carrier comprising:

a pair of coaxially aligned rotatable shafts, one of the shafts being attachable to the machine tool, the other of the shafts accommodating the tap set thereonto with a certain amount of axial play, a central sleeve circumscribing the adjacent ends of the shafts for angular connection therebetween and being angularly rigid with one of the shafts and having a helical cam groove extending over a 360° arc, the opposite terminals of the cam groove being interconnected by an S-shaped interconnecting groove, a lug rigid with the said other of the shafts and followable in the cam and interconnecting grooves, with the directions of rotation of the shafts one with respect to the other being reversible and the central sleeve being slidable under the influence of the force produced thereupon by the lug and with the shafts being disengageable angularly one from the other while the central sleeve is operable through its longitudinal displacement and while the lug moves from one end of the cam groove to and through the S-shaped interconnecting groove for return of the lug to initial position in the opposite end of the cam groove in the absence of any reversal of the rotational motion of the central sleeve.

2. In the tap carrier as set forth in claim 1, including: inner and outer sleeves circumscribing the central sleeve on opposite sides thereof, the inner sleeve being integral with one of the shafts, the outer sleeve being integral with the other of the shafts, the central sleeve being angularly rigid with the inner sleeve, and the lug being carried by the outer sleeve.

* * * * *